(12) United States Patent
Goswami et al.

(10) Patent No.: US 10,778,742 B2
(45) Date of Patent: Sep. 15, 2020

(54) SYSTEM AND METHOD FOR SHARING MULTIMEDIA CONTENT WITH SYNCHED PLAYBACK CONTROLS

(71) Applicant: SONY CORPORATION, Tokyo (JP)

(72) Inventors: Nabarun Goswami, Bangalore (IN); Madhvesh Sulibhavi, Bangalore (IN)

(73) Assignee: SONY CORPORATION, Tokyo (JP)

( * ) Notice: Subject to any disclaimer, the term of this patent is extended or adjusted under 35 U.S.C. 154(b) by 412 days.

(21) Appl. No.: 15/289,353

(22) Filed: Oct. 10, 2016

(65) Prior Publication Data

US 2018/0103078 A1    Apr. 12, 2018

(51) Int. Cl.
| | |
|---|---|
| *H04L 29/06* | (2006.01) |
| *H04N 21/2387* | (2011.01) |
| *H04N 21/6587* | (2011.01) |
| *H04N 21/4788* | (2011.01) |
| *H04N 21/81* | (2011.01) |
| *H04L 29/08* | (2006.01) |
| *H04N 21/234* | (2011.01) |

(52) U.S. Cl.
CPC .......... *H04L 65/602* (2013.01); *H04L 65/604* (2013.01); *H04N 21/2387* (2013.01); *H04N 21/4788* (2013.01); *H04N 21/6587* (2013.01); *H04N 21/8113* (2013.01); *H04L 67/12* (2013.01); *H04N 21/23406* (2013.01)

(58) Field of Classification Search
CPC ..... H04L 67/14; H04L 65/1069; H04N 21/47; H04N 5/4403
USPC ........................................................ 709/227
See application file for complete search history.

(56) References Cited

U.S. PATENT DOCUMENTS

| | | | |
|---|---|---|---|
| 7,571,014 B1 * | 8/2009 | Lambourne | H04R 27/00 700/94 |
| 8,688,841 B2 | 4/2014 | Issa et al. | |
| 10,110,678 B2 * | 10/2018 | Hebsur | G06K 9/46 |
| 2004/0003090 A1 | 1/2004 | Deeds et al. | |
| 2005/0286546 A1 | 12/2005 | Bassoli et al. | |
| 2008/0060084 A1 * | 3/2008 | Gappa | G09B 5/00 726/28 |
| 2008/0109852 A1 | 5/2008 | Kretz et al. | |

(Continued)

OTHER PUBLICATIONS

Disco Volante, "wahwah.fm", evolver.fm, Mar. 13, 2012, pp. 4 available at: http://evolver.fm/appdb/app/wahwahfm/#download&as_qdr=y15.

(Continued)

*Primary Examiner* — Mahran Y Abu Roumi
(74) *Attorney, Agent, or Firm* — Chip Law Group

(57) ABSTRACT

A system and method for data communication is disclosed, which includes a first electronic device configured to receive an input to enable selection of a multimedia content item on the first electronic device. The selected multimedia content item is communicated, by the first electronic device, to a second electronic device along with playback controls. Playback of the selected multimedia content item may be controlled at the first electronic device and the second electronic device based on synching of the communicated playback controls during the playback. The control is performed such that a current playback time of the selected multimedia content item is in sync at the first electronic device and the second electronic device.

19 Claims, 12 Drawing Sheets

(56) References Cited

U.S. PATENT DOCUMENTS

| | | | |
|---|---|---|---|
| 2009/0062947 A1* | 3/2009 | Lydon | G06F 16/4387 700/94 |
| 2009/0077610 A1* | 3/2009 | White | H04N 21/6582 725/131 |
| 2009/0327244 A1 | 12/2009 | Rizal | |
| 2010/0228740 A1* | 9/2010 | Cannistraro | G06F 16/686 707/748 |
| 2013/0051554 A1* | 2/2013 | Braness | H04N 21/6581 380/200 |
| 2013/0254663 A1* | 9/2013 | Bates | G06F 3/0481 715/716 |
| 2013/0305152 A1* | 11/2013 | Griffiths | G06F 3/04883 715/716 |
| 2014/0237523 A1* | 8/2014 | Onishi | H04N 21/6175 725/88 |
| 2015/0094834 A1* | 4/2015 | Vega | G06F 3/162 700/94 |
| 2017/0251260 A1* | 8/2017 | Sanders | H04N 21/4668 |
| 2017/0332135 A1* | 11/2017 | Stark | H04N 21/23113 |
| 2018/0077449 A1* | 3/2018 | Herz | H04N 21/436 |

OTHER PUBLICATIONS

Arianna Bassoli et al, "Tuna: Local Music Sharing With Handheld Wi-Fi Devices", Media Lab Europe, Jul. 15-16, 2004, pp. 23, Ireland.

* cited by examiner

US 10,778,742 B2

SYSTEM AND METHOD FOR SHARING MULTIMEDIA CONTENT WITH SYNCHED PLAYBACK CONTROLS

CROSS-REFERENCE TO RELATED APPLICATIONS/INCORPORATION BY REFERENCE

None.

FIELD

Various embodiments of the disclosure relate a system and method for data communication. More specifically, various embodiments of the disclosure relate to a system and method for sharing of multimedia content with synched playback controls.

BACKGROUND

With advancements in social networking and communication technologies, sharing of multimedia content has become quite popular among users. Typically, a user (a sender) of an electronic device, may share multimedia content stored on the electronic device with a remote electronic device of another user (a recipient), over a communication network. In certain scenarios, both the sender and the recipient may wish to listen to similar music beats or view similar scenes of the multimedia content. In such scenarios, synchronous playback of the shared multimedia content at multiple electronic devices over a network may be desirable for a captivating and enhanced user experience.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for sharing multimedia content with synched playback controls is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
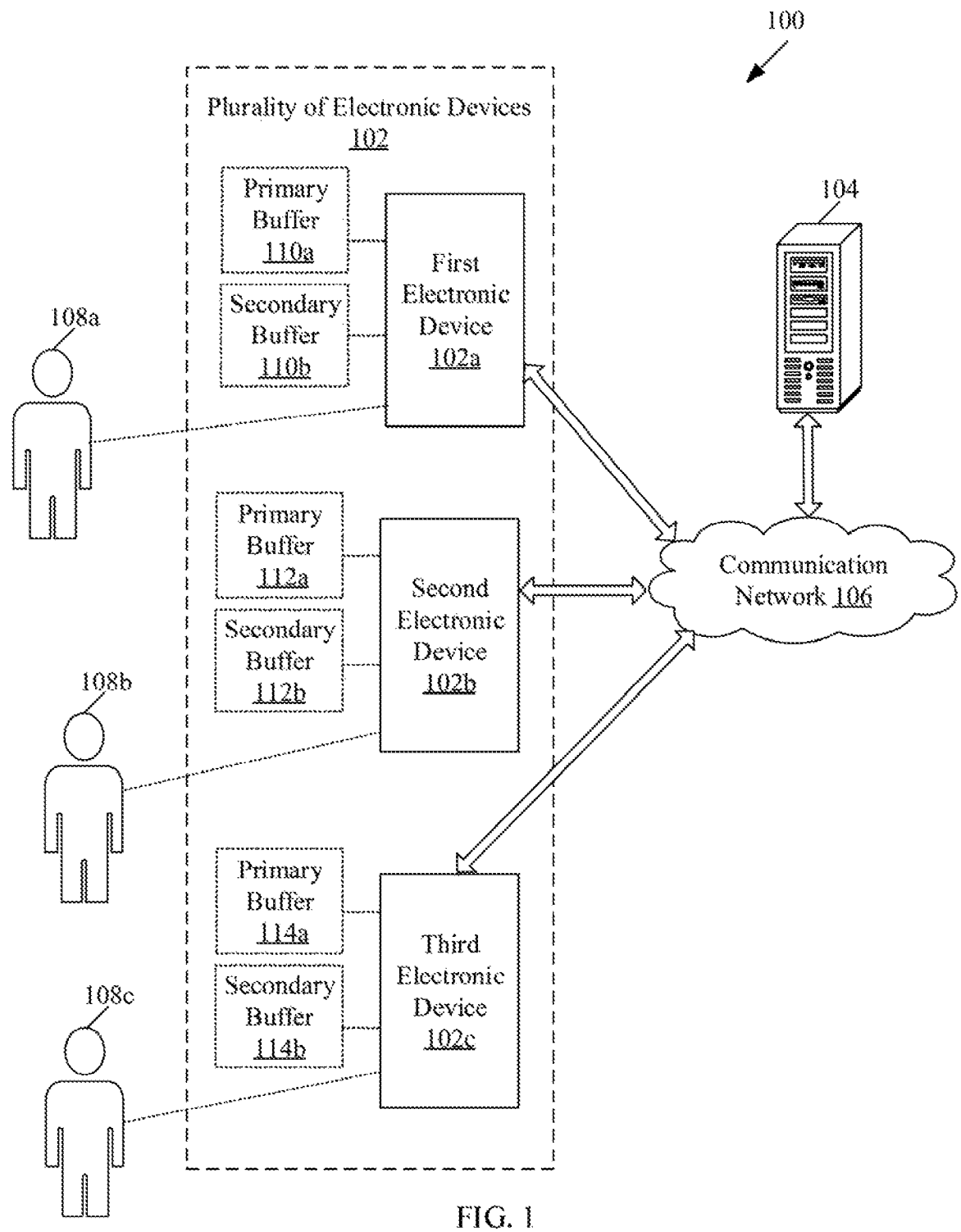
FIG. 1 is a block diagram that illustrates an exemplary network environment for sharing multimedia content, in accordance with an embodiment of the disclosure.

The following described implementations may be found in the disclosed system and method for sharing multimedia content with synched playback controls. Exemplary aspects of the disclosure may include a first electronic device that may receive an input to enable selection of a multimedia content item on the first electronic device. The first electronic device may communicate the selected multimedia content item to a second electronic device along with playback controls. The first electronic device may control playback of the selected multimedia content item at the first electronic device and the second electronic device. The playback may be controlled such that a current playback time of the selected multimedia content item may be in sync at the first electronic device and the second electronic device during the playback. The first electronic device may control playback of the selected multimedia content based on synching of the communicated playback controls.

In accordance with an embodiment, the first electronic device and the second electronic device may correspond to a smartphone, a tablet device, a wearable device, and/or a speaker system. The first electronic device and the second electronic device may further correspond to a camera, a smart glass, a television, a computing device, and/or an Internet-of-Things (IoT) device. The multimedia content item may be an audio, such as a two dimensional (2D) audio, a three dimensional (3D) audio, a surround sound audio, and/or a video, such as a 2D, 3D, an Ultra high-definition (ultra HD) video, or a 4K video. The second electronic device may be configured to control playback of the multimedia content item in the first electronic device based on the playback controls received by the second electronic device from the first electronic device.

In accordance with an embodiment, the communication of the selected multimedia content item and the synching of the communicated playback controls may be performed, via different communication channels. Alternatively, the communication of the selected multimedia content item and the synching of the communicated playback controls may be performed, via a same communication channel. The multimedia content item communicated to the second electronic device may be sourced from a multimedia streaming server or a local storage device of the first electronic device.

In accordance with an embodiment, the multimedia content item may be streamed from a primary buffer of the first electronic device to the second electronic device. The streamed multimedia content item may be cached at a corresponding primary buffer of the second electronic device for a continuous synching of the communicated playback controls during the playback. The first electronic device may be configured to establish a new session with a third electronic device to receive another multimedia content item from the third electronic device while simultaneously streaming multimedia content item from the primary buffer. The other multimedia content stream may be stored in a secondary buffer when the primary buffer is engaged in the first electronic device.

In accordance with an embodiment, the first electronic device may be configured to schedule the communication of the multimedia content item together with the playback controls to the second electronic device from a content streaming server. The scheduled communication of the multimedia content item may be based on a time of day, a date, and/or a user-defined trigger mechanism to initiate communication to the second electronic device. In accordance with an embodiment, the first electronic device may be configured to transfer an ownership right to the second electronic device. The ownership right may be transferred to control a further communication of the received multimedia control item to the third electronic device.

In accordance with an embodiment, the first electronic device may be configured to generate an interface to enable a social interaction with a plurality of electronic devices connected in a session. The social interaction among the plurality of electronic devices and the playback of the selected multimedia content item at the plurality of electronic devices may occur simultaneously. The first electronic device may be configured to display all connected electronic devices of the plurality of electronic devices on the generated interface during the playback of the communicated multimedia content item in the session.

FIG. 1 is a block diagram that illustrates an exemplary network environment for sharing multimedia content with synched playback controls, in accordance with an embodiment of the disclosure. With reference to FIG. 1, there is shown a network environment 100. The network environment 100 may include a plurality of electronic devices 102, such as a first electronic device 102a, a second electronic device 102b, and a third electronic device 102c. There is further shown a multimedia streaming server 104, a communication network 106, and a plurality of users, such as a first user 108a, a second user 108b, and a third user 108c. The first electronic device 102a may include a primary buffer 110a and a secondary buffer 110b. The second electronic device 102b may similarly include a primary buffer 112a and a secondary buffer 112b. The third electronic device 102c may also include a primary buffer 114a and a secondary buffer 114b. The first electronic device 102a, the second electronic device 102b, and the third electronic device 102c, of the plurality of electronic devices 102, may be communicatively coupled with each other and the multimedia streaming server 104, via the communication network 106.

The plurality of electronic devices 102 may include the first electronic device 102a, the second electronic device 102b, and/or the third electronic device 102c. The first electronic device 102a may comprise suitable circuitry, interfaces, and/or code that may be configured to communicate multimedia content items to the second electronic device 102b and/or the third electronic device 102c. Thus, the first electronic device 102a may correspond to a multimedia content output device. The second electronic device 102b and the third electronic device 102c may be similar to the first electronic device 102a. Examples of the plurality of electronic devices 102 may include, but are not limited to, a smartphone, a tablet device, a wearable device, a speaker system, a camera, a smart glass, a television, a computing device, a multimedia output device, a projector, an augmented-reality device, a virtual-reality device, an audio recording device, a video recording device, and/or an Internet-of-Things (IoT) device.

The multimedia streaming server 104 may comprise suitable circuitry, interfaces, and/or code that may be configured to stream the multimedia content items to the various electronic devices from the plurality of electronic devices 102. Examples of the multimedia streaming server 104 may include, but not limited to, a database server, a web server, a file server, a media server, a communication server, an audio or video streaming server, other content management servers, and/or a combination thereof.

The communication network 106 may include a medium through which the plurality of electronic devices 102 may be communicatively connected with each other and the multimedia streaming server 104. Examples of the communication network 106 may include, but are not limited to, the Internet, a cloud network, a Wireless Fidelity (Wi-Fi) network, a Local Area Network (LAN), wireless WAN and/or a Metropolitan Area Network (MAN). Various devices in the network environment 100 may be configured to connect to the communication network 106, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols.

The primary buffer 110a and the secondary buffer 110b may correspond to a cache memory. The first electronic device 102a may be configured to temporarily store the multimedia content items in the primary buffer 110a and the secondary buffer 110b for streaming purposes. The primary buffer 112a, the secondary buffer 112b, the primary buffer 114a, and the secondary buffer 114b may be similar to the primary buffer 110a and/or the secondary buffer 110b. Examples of the primary buffer 110a and/or the secondary buffer 110b may include, but not limited to, Random Access Memory (RAM), Read Only Memory (ROM), a CPU cache, a register memory, and/or a cache memory.

In operation, the first electronic device 102a may be configured to receive an input from the first user 108a to enable selection of the multimedia content item on the first electronic device 102a. The first electronic device 102a may be configured to communicate the selected multimedia content item along with playback controls to the second electronic device 102b, via communication network 106. The first electronic device 102a may be configured to control a playback of the selected multimedia content item at the first electronic device 102a and the second electronic device 102b, based on the communicated playback controls. The control may be performed such that a current playback time of the selected multimedia content item may be in sync at the first electronic device 102a and the second electronic device 102b. The control may be performed based on synching of the communicated playback controls at the two devices.

In accordance with an embodiment, the communication of the selected multimedia content item and the synching of the communicated playback controls may be performed, via a same communication channel established between the first electronic device 102a and the second electronic device 102b. Thus, in this scenario, a common communication channel may be used by the two electronic devices 102a and 102b to share the multimedia content item as well as to synch the playback controls of the shared multimedia content item. Alternatively, the communication channel used to share the multimedia content item may be different from that used to synch the playback controls of the shared multimedia content item. Example of communication channels may include, but are not limited to, an Internet-of-Things (IoT) gateway, a Voice-over-IP (VOIP)/text chat channel, the Internet, an alarm-payload channel, and/or other communication channels of the communication network 106. The selected multimedia content item may be an audio or a video.

In accordance with an embodiment, the first electronic device 102a may be configured to generate an interface to enable a social interaction with the plurality of electronic devices 102 in a session. The social interaction among the plurality of electronic devices 102 and the playback of the selected multimedia content item at the plurality of electronic devices 102 may occur simultaneously. The first electronic device 102a may be further configured to display an indication of all connected electronic devices from the plurality of electronic devices 102, via the generated interface. Each connected electronic device may be displayed at the generated interface at the first electronic device 102a during the playback of the communicated multimedia content item in the session.

In accordance with an embodiment, the second electronic device 102b of the plurality of electronic devices 102 may be configured to control playback of the multimedia content item at the first electronic device 102a. The same playback controls received by the second electronic device 102b from the first electronic device 102a may be utilized for the control of the current playback time of the shared multimedia content item at the first electronic device 102a. In accordance with an embodiment, the multimedia content item communicated to the second electronic device 102b may be sourced from the multimedia streaming server 104 or a local storage device of the first electronic device 102a. The local storage device of the first electronic device 102a may correspond to a local storage, such as an in-built memory or an external storage medium connected to the first electronic device 102a.

In accordance with an embodiment, the multimedia content item may be streamed from the primary buffer 110a of the first electronic device 102a to the second electronic device 102b. The streamed multimedia content item may be cached at a corresponding primary buffer 112a of the second electronic device 102b for a continuous synching of the communicated playback controls during the playback. In an accordance with an embodiment, the first electronic device 102a may dynamically reconfigure size of multimedia content item stream, in an event there is a mismatch between size of the primary buffer 112a of the second electronic device 102b and the size of multimedia content item stream. Alternatively, the second electronic device 102b may dynamically reconfigure the size of the primary buffer 112a, when there is a mismatch between the size of the multimedia content item stream and the primary buffer 112a of the second electronic device 102b. In accordance with an embodiment, the first electronic device 102a and the second electronic device 102b may further comprise a look-ahead buffer. The look-ahead buffer may be used for synching of the playback of the multimedia content item at the first electronic device 102a and the second electronic device 102b. The first electronic device 102a may be further configured to transfer an ownership right to the second electronic device 102b. The ownership rights may be transferred to the second electronic device 102b to control further communication of the received multimedia content item to the third electronic device 102c of the plurality of electronic devices 102.

In accordance with an embodiment, the first electronic device 102a may be configured to schedule communication of one or more multimedia content items together with the playback controls to the second electronic device 102b from the multimedia streaming server 104. The scheduled communication of the multimedia content items may be based on a time of day, a date, and/or a user-defined trigger mechanism to initiate communication of the pre-selected one or more multimedia content items to the second electronic device 102b.

In accordance with an embodiment, the first electronic device 102a may be further configured to establish a new session with the third electronic device 102c. The first electronic device 102a may be configured to receive another multimedia content item from the third electronic device 102c, while simultaneously streaming the multimedia content item from the primary buffer 110a. The other multimedia content stream may be stored in the secondary buffer 110b, when the primary buffer 110a may be already in use for multimedia storage, buffering, and/or playback by the first electronic device 102a.

Figure 2:
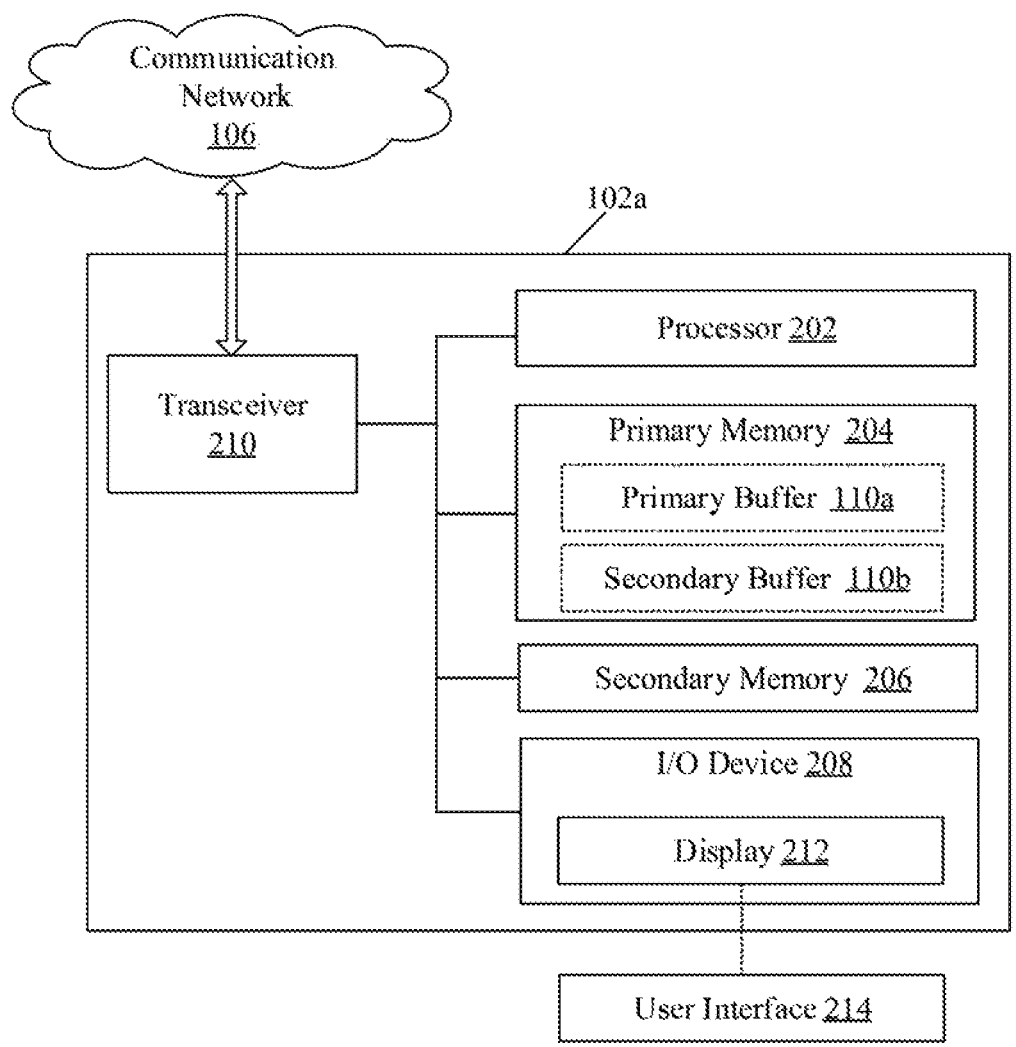
FIG. 2 is a block diagram that illustrates an exemplary electronic device, in accordance with an embodiment of the disclosure.

FIG. 2 is a block diagram that illustrates an exemplary electronic device, in accordance with an embodiment of the disclosure. FIG. 2 is explained in conjunction with elements from FIG. 1. With reference to FIG. 2, there is shown the first electronic device 102a. The first electronic device 102a may include one or more processors, such as a processor 202, a primary memory 204, a secondary memory 206, an I/O device 208, and a transceiver 210. In accordance with an embodiment, a display 212 may be provided in the I/O device 208. There is further shown a user interface (UI) 214 rendered on the display 212. The primary memory 204 is shown to include the primary buffer 110a and the secondary buffer 110b. The processor 202 may be communicatively coupled to the primary memory 204, the secondary memory 206, the I/O device 208, and the transceiver 210. The transceiver 210 may enable the first electronic device 102a to communicate with other communication devices from the plurality of electronic devices 102 and/or one or more servers, such as the multimedia streaming server 104, via the communication network 106.

The processor 202 may comprise suitable logic, circuitry, interfaces, and/or code that may be configured to execute a set of instructions stored in the secondary memory 206. The processor 202 may be implemented based on a number of processor technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The primary memory 204 may include a plurality of buffers, such as the primary buffer 110a and the secondary buffer 110b. The primary buffer 110a and the secondary buffer 110b may be used to stream or receive one or more multimedia content items. Example implementations of the primary memory 204 may include, but not limited to, Random Access Memory (RAM), Dynamic Random Access Memory (DRAM), Static Random Access Memory (SRAM), a CPU cache, and/or a cache memory.

The secondary memory 206 may comprise suitable logic, circuitry, and/or interfaces that may be configured to store a set of instructions executable by the processor 202. The secondary memory 206 may be further configured to store data and code related to operating systems and associated applications of the first electronic device 102a. Example implementations of the secondary memory 206 may include, but not limited to, a Read Only Memory (ROM), a Hard Disk (HDD), an optical disk, a flash memory, a Secure Digital (SD) card, a Solid-State Drive (SSD), a Magnetoresistive Random-access Memory (MRAM), and/or a Ferroelectric Random Access Memory (FRAM).

The I/O device 208 may comprise suitable logic, circuitry, interfaces, and/or code that may be configured to receive an input from a user. The I/O device 208 may be further configured to provide an output to the user. The I/O device 208 may comprise various input and output devices that may be configured to communicate with the processor 202. Examples of the input devices may include, but not limited to, a touch screen, a keyboard, a mouse, a joystick, a microphone, a camera, a motion sensor, and/or a light sensor. Examples of the output devices may include, but not limited to, the display 212 and/or a speaker.

The transceiver 210 may comprise suitable logic, circuitry, interfaces, and/or code that may be configured to communicate multimedia content items to the plurality of electronic devices 102, via the communication network 106. The transceiver 210 may be implemented by use of various known technologies to support wired or wireless communication of the first electronic device 102a with the communication network 106. The transceiver 210 may include, but not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The transceiver 210 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS). The wireless communication or an IoT gateway communicatively coupled to the transceiver 210 may further use Message Queue Telemetry Transport (MQTT), Extensible Messaging and Presence Protocol (XMPP), Data Distribution Service (DDS), Advanced Message Queuing Protocol (AMQP), Constrained Application Protocol (CoAP), and/or cellular communication protocols, or the Internet to communicate to one or more other devices of the plurality of electronic devices 102, via the communication network 106.

The display 212 may comprise suitable logic, circuitry, interfaces, and/or code that may be configured to display the UI 214. The display 212 may be further configured to render one or more features and/or applications of the first electronic device 102a. Examples of the display 212 may include, but not limited to, a Liquid Crystal Display (LCD) display, a Light Emitting Diode (LED) display, and/or an Organic LED (OLED) display or other display.

The UI 214 may be a visual interface that may facilitate the user to interact with one or more applications and/or operating systems of the first electronic device 102a. The UI 214 may be a graphical user interface (GUI) that may include graphical controls, such as a menu bar, a toolbar, a window, a button, and other such controls.

In operation, the processor 202 may be configured to communicate a multimedia sharing request to one or more of the plurality of electronic devices 102, such as the second electronic device 102b, via the transceiver 210. The processor 202 may be configured to check whether the multimedia sharing request is accepted or rejected by the one or more of the plurality of electronic devices 102. For example, the second electronic device 102b may accept the multimedia sharing request. An acceptance acknowledgement may be received, via the transceiver 210, from the second electronic device 102b.

In accordance with an embodiment, the processor 202 may be configured to establish a session between the first electronic device 102a and one or more of the plurality of electronic devices 102, which accepted the multimedia sharing request (such as the second electronic device 102b). The processor 202 may be configured to receive an input from the first user 108a, via the I/O device 208, to enable selection of the multimedia content item on the first electronic device 102a. The multimedia content item, such as an audio item, may be selected via the UI 214 rendered on the display 212 of the first electronic device 102a. The multimedia content item to be communicated to second electronic device 102b may be sourced from the multimedia streaming server 104. Alternatively, the multimedia content item may be pre-stored at a local storage device, such as the secondary memory 206, of the first electronic device 102a.

In accordance with an embodiment, the processor 202 may be configured to associate playback controls in accordance with the selected multimedia content item. For example, when an audio item, such as a song is selected, certain playback controls, such as forward, reverse, pause, play, audio info, or subtitles, which may be compatible and useful with respect to control of playback of the audio item, may be associated. In accordance with an embodiment, sound manipulation controls, such as volume, loudness, bass, treble, equalizer, or other audio controls may also be associated. Similarly, when a video item, such as a video song, is selected, certain additional playback controls, such as slow-motion playback, video visualization controls, may also be associated with the selected multimedia content item.

In accordance with an embodiment, the processor 202 may be configured to communicate the selected multimedia content item to a desired electronic device, such as the second electronic device 102b along with the associated playback controls, via the transceiver 210. The processor 202 may be configured to control the playback of the selected multimedia content item at the first electronic device 102a and the second electronic device 102b. The control may be performed such that the current playback time of the selected multimedia content item may be synched at the first electronic device 102a and the second electronic device 102b, during the playback.

For example, the processor 202 may have to execute another operations, such as receiving an incoming call, or the like, during the playback of the selected multimedia content item. Thus, the processor 202 may require to pause the playback of the multimedia content item at the first electronic device 102a. In such a case, the processor 202 may transmit a playback control, such as pause, to the second electronic device 102b to pause the playback of the multimedia content item at the second electronic device 102b for an entire time duration required to execute other operation(s). Alternatively, the processor 202 may not transmit the pause playback control to the second electronic device 102b. In such a case, the playback of the multimedia content item may only be paused at the first electronic device 102a. Further, when the execution of the other operation is complete, the processor 202 may resume the playback of the multimedia content item from a current playback time of the multimedia content item at the second electronic device 102b.

In accordance with an embodiment, the processor 202 may be configured to generate an interface, such as a chat interface, a video call interface, and/or a voice call interface, on the first electronic device 102a to enable the social interaction with one or more of the plurality of electronic devices 102 connected in the session. In accordance with an embodiment, the generated interface may be configured to receive hands free-gesture based input, to enable the social interaction with one or more of the plurality of electronic devices 102 connected in the session. The social interaction among the various connected devices from the plurality of electronic devices 102 and the playback of the selected multimedia content item at the plurality of electronic devices 102 may occur simultaneously. The processor 202 may be further configured to display all connected electronic devices among the plurality of electronic devices 102 on the generated interface during the playback of the communicated multimedia content item in the session.

In accordance with an embodiment, the multimedia content items communicated to the second electronic device 102b by the processor 202 may be sourced from the multimedia streaming server 104. The multimedia content items may be alternatively sourced from the local storage, such as the secondary memory 206, of the first electronic device 102a. The processor 202 may be configured to stream the multimedia content items from the primary buffer 110a of the first electronic device 102a to the second electronic device 102b. The streamed multimedia content item may be cached at the corresponding primary buffer (not shown) of the second electronic device 102b for the continuous synching of the communicated playback controls during the playback.

In accordance with an embodiment, the processor 202 may be further configured to schedule the communication of the multimedia content items together with the playback controls to the second electronic device 102b from the content streaming server, such as the multimedia streaming server 104. The scheduled communication of the multimedia content items from the multimedia streaming server 104 may be based on a preset time of day, date, and/or a user-defined trigger mechanism(s) to initiate communication with the second electronic device 102b or other pre-selected electronic device. In accordance with an embodiment, the functionalities or operations performed by the first electronic device 102a, as described in FIG. 1 may be performed by the processor 202. Other operations performed by the processor 202 may be understood from the description in the FIGS. 3A, 3B, 3C, 4, 5A, and 5B.

Figure 3A:
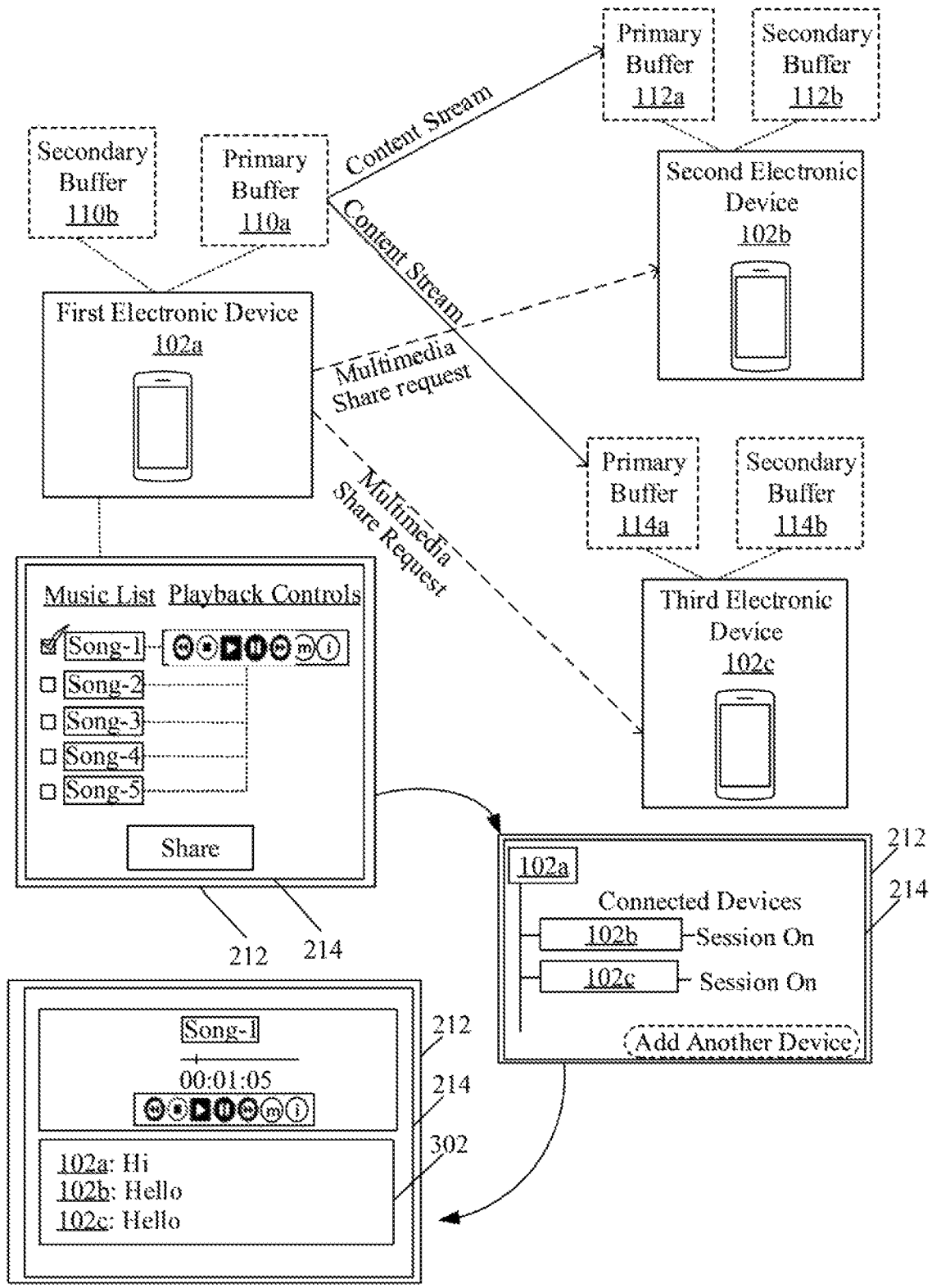
FIGS. 3A, 3B, 3C, and 3D, collectively, illustrate a first exemplary scenario for implementation of the disclosed system and method for sharing multimedia content with synched playback controls, in accordance with an embodiment of the disclosure.
Figure 3B:
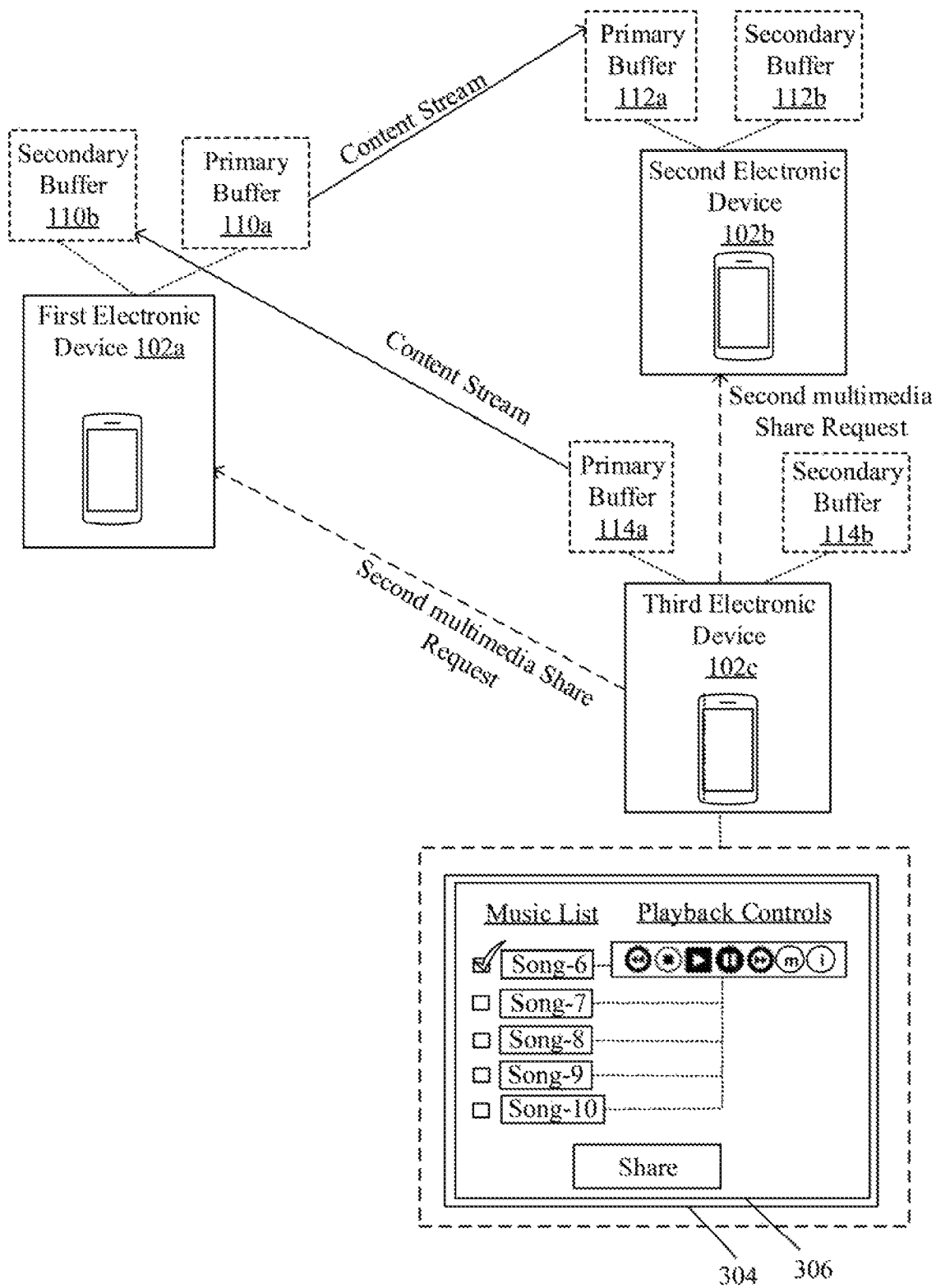
Figure 3C:
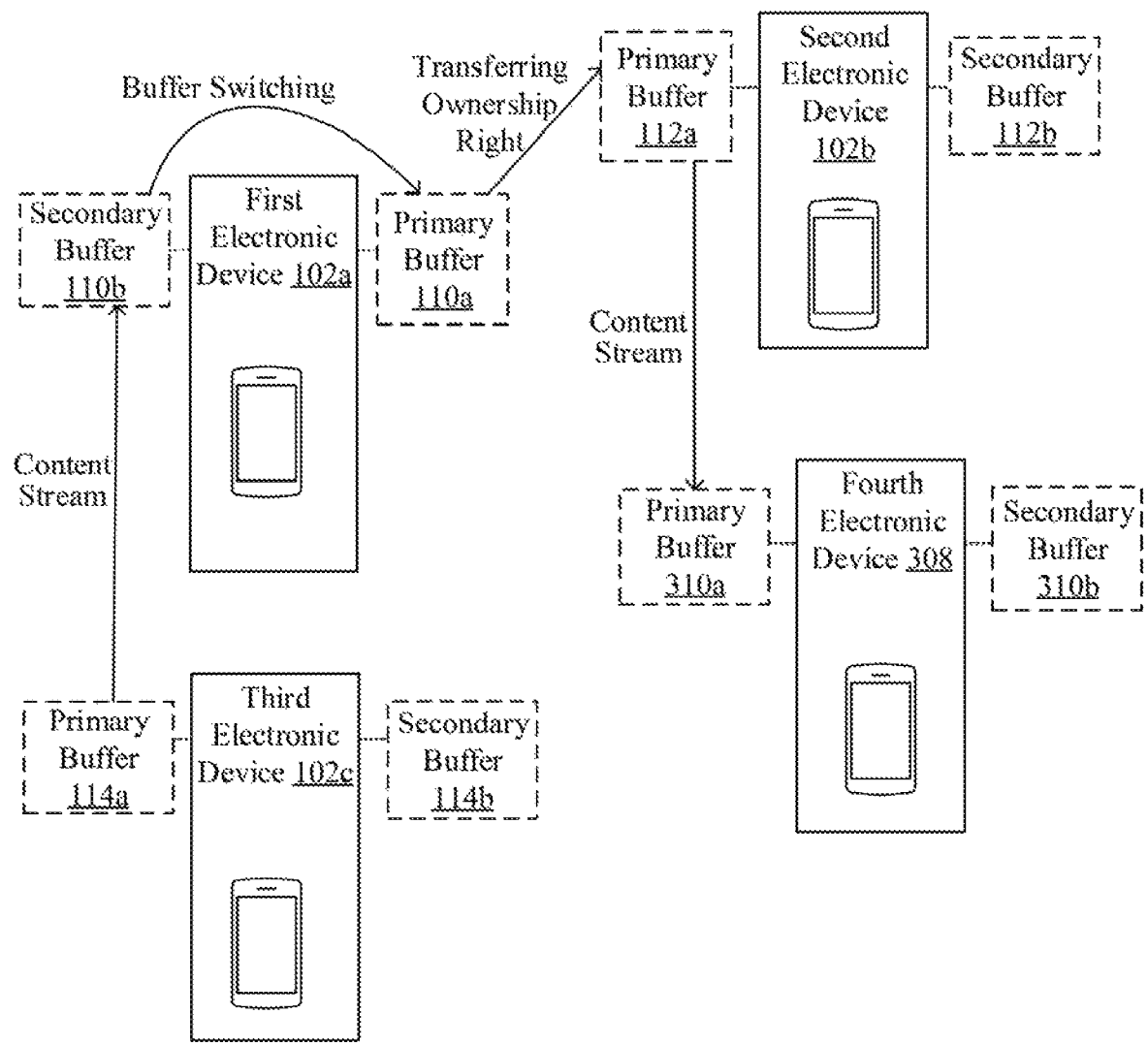

FIGS. 3A, 3B, and 3C, collectively, illustrate a first exemplary scenario to share multimedia content with synched playback controls, in accordance with an embodiment of the disclosure. FIGS. 3A, 3B, and 3C are described in conjunction with elements from FIGS. 1 and 2. With reference to FIG. 3A, there is shown the first electronic device 102a, the second electronic device 102b, the third electronic device 102c. There is further shown the UI 214 rendered on the display 212 and a social interaction interface 302 displayed on the UI 214. The first electronic device 102a may include the primary buffer 110a and the secondary buffer 110b. The second electronic device 102b may include the primary buffer 112a and the secondary buffer 112b. The third electronic device may include the primary buffer 114a and the secondary buffer 114b.

In operation, the first electronic device 102a may receive an input to enable selection of a song, such as a song-1, from a list of music tracks, via the UI 214, of the first electronic device 102a. The first electronic device 102a may be configured to communicate a first multimedia share request to both the second electronic device 102b and the third electronic device 102c to share the song-1. In accordance with an embodiment, both the second electronic device 102b and the third electronic device 102c may accept the first multimedia share request received from the first electronic device 102a. The first electronic device 102a may receive an acceptance acknowledgment from the second electronic device 102b and the third electronic device 102c. In response to the received acceptance acknowledgment, a session may be established among the three devices, such as the first electronic device 102a, the second electronic device 102b and the third electronic device 102c. Further, the first electronic device 102a may be configured to associate playback controls for the audio item, such as the selected song-1, in the established session, as shown in the UI 214 of the FIG. 3A.

In accordance with an embodiment, the first electronic device 102a may be configured to cache the selected song-1 in the primary buffer 110a of the first electronic device 102a. The first electronic device 102a may then share the selected song-1 with the second electronic device 102b and the third electronic device 102c along with the playback controls associated with the song-1. The song-1 may be streamed from the primary buffer 110a of the first electronic device 102a to the second electronic device 102b and the third electronic device 102c. The streamed content of the song-1 along with the associated playback controls may be cached at the corresponding primary buffer 112a of the second electronic device 102b and the primary buffer 114a of the third electronic device 102c, as shown. The caching of the song-1 at the primary buffers, such as the primary buffer 112a and the primary buffer 114a, may enable a continuous synching of the communicated playback controls, during the playback of the song-1 at all the three devices, such as the first electronic device 102a, the second electronic device 102b, and the third electronic device 102c. In accordance with an embodiment, for the initiation of the playback of the song-1, at all the three devices, a size of the multimedia content item streamed must exceed a data threshold value. The data threshold value may be specified by a user, such as the first user 108a, the second user 108b, or the third user 108c.

In accordance with an embodiment, the first electronic device 102a may be further configured to display an indication of all the connected electronic devices in the established session, such as the second electronic device 102b and the third electronic device 102c, via the UI 214 rendered on the display 212, as shown. The first electronic device 102a may be further configured to generate an interface, such as the social interaction interface 302, on the UI 214, to enable the social interaction with connected electronic devices. The social interaction among the connected electronic devices and the playback of the song-1 at the three electronic devices 102a, 102b, and 102c may occur simultaneously.

With reference to FIG. 3B, there is further shown a new multimedia share request initiated by the third electronic device 102c for the first electronic device 102a and the second electronic device 102b. There is further shown a display 304 of the third electronic device 102c and a UI 306 rendered on the display 304 of the third electronic device 102c. The UI 306 may be similar to the UI 214 of the first electronic device 102a.

In accordance with an embodiment, the third electronic device 102c may be configured to receive an input, via the UI 306, to enable selection of a song, from the list of music tracks pre-stored in the third electronic device 102c, as shown. For instance, song-6 is shown to be selected on the third electronic device 102c, via the UI 306. As per the content type (such as an audio or video), playback controls for audio, may be associated with the selected song-6. The third electronic device 102c may be configured to share a new multimedia share notification, such as a second multimedia share request, with the first electronic device 102a and the second electronic device 102b for sharing the song-6 while the streaming and playback for the Song-1 may be in progress.

In a certain scenario, the first electronic device 102a may accept the second multimedia share request, whereas the second electronic device 102b may deny the second multimedia share request. The third electronic device 102c may communicate the song-6 along with the associated playback controls to the first electronic device 102a. The communication may occur via another communication channel of the communication network 106. The song-6 may be streamed from the primary buffer 114a of the third electronic device 102c to the first electronic device 102a. The song-6 along with the associated playback controls may be cached at the secondary buffer 110b of the first electronic device 102a as the primary buffer 110a of the first electronic device 102a may be engaged in continuous streaming of song-1 to the second electronic device 102b. In such a scenario, the primary buffer 110a of the first electronic device 102a may continue to stream the song-1 to the primary buffer 112a of second electronic device 102b till the entire content of the song-1, is streamed.

With reference to FIG. 3C, there is further shown a fourth electronic device 308 with a primary buffer 310a and a secondary buffer 310b. FIG. 3C depicts a first example of ownership right transfer mechanism between two devices and switching of caching from one buffer to another buffer within an electronic device, such as the first electronic device 102a.

In accordance with an embodiment, the song-1 may be streamed from the primary buffer 110a of the first electronic device 102a to the primary buffer 112a of the second electronic device 102b. The first electronic device 102a may be configured to transfer an ownership right of the song-1 to the second electronic device 102b, via the UI 214. The transfer of the ownership right to the second electronic device 102b may enable the second electronic device 102b to control further communication of the received song-1 to other electronic devices, such as the fourth electronic device 308. Accordingly, the second electronic device 102b may then stream the received song-1 along with the associated playback controls from the primary buffer 112a of the second electronic device 102b to the fourth electronic device 308. The song-1 may be cached at the primary buffer 310a of the fourth electronic device 308 for the continuous synching of the communicated playback controls, during the playback.

In a scenario, the first electronic device 102a may detect that the streaming of song-1 from the primary buffer 110a of the first electronic device 102a to the second electronic device 102b may be completed. Further, the first electronic device 102a may detect caching for the receipt of the content stream of song-6 from the third electronic device 102c to the secondary buffer 110b of the first electronic device 102a, may be in-progress. In such a scenario, the first electronic device 102a may be configured to dynamically switch the caching of the content stream of song-6 from the secondary buffer 110b to the primary buffer 110a. The dynamic switching makes possible to free-up the secondary buffer 110b for further receipt (or communication) of another multimedia content item from (or to) another electronic device.

Figure 3D:
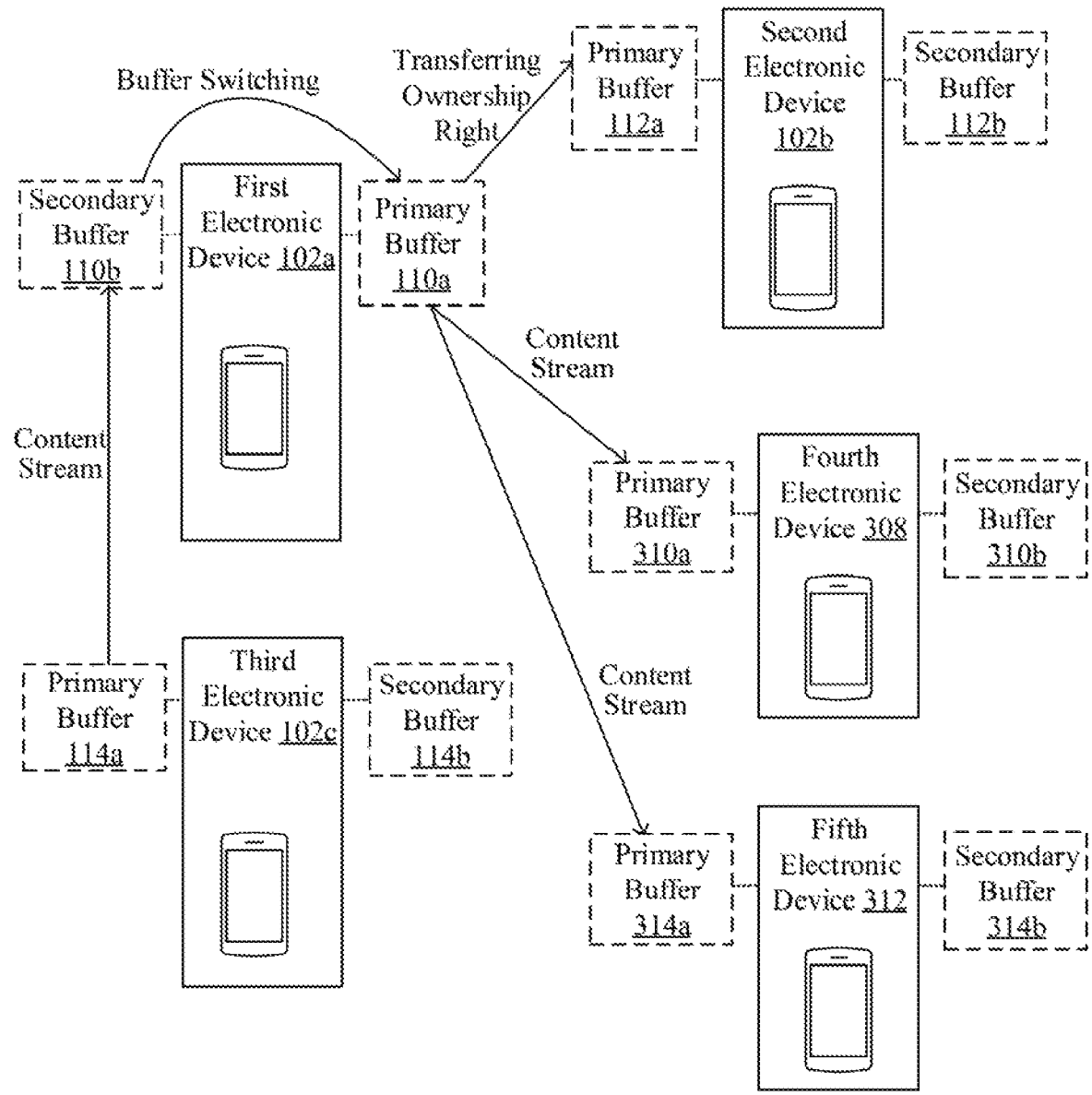

With reference to FIG. 3D, there is further shown a fifth electronic device 312 with a primary buffer 314a and a secondary buffer 314b. FIG. 3D depicts a second example of ownership right transfer mechanism between two devices and switching of caching from one buffer to another buffer within an electronic device, such as the first electronic device 102a.

In accordance with an embodiment, the song-1 may be streamed from the primary buffer 110a of the first electronic device 102a to the primary buffer 112a of the second electronic device 102b. The song-1 may be streamed from the primary buffer 110a of the first electronic device 102a to the primary buffer 310a of the fourth electronic device 308 and the primary buffer 314a of the fifth electronic device 312. The first electronic device 102a may be configured to transfer an ownership right of the song-1 to the second electronic device 102b, via the UI 214.

In a scenario, the first electronic device 102a may get disconnected with the second electronic device 102, the fourth electronic device 308, and the fifth electronic device 312 in the established session. In such a case, the fourth electronic device 308 and the fifth electronic device 312 may request the second electronic device 102b to continue sharing of the song-1. Based on the received control related to the ownership right, and the request from the fourth electronic device 308 and the fifth electronic device 312, the second electronic device 102b may then stream the received song-1 along with the associated playback controls to the fourth electronic device 308 and the fifth electronic device 312. The second electronic device 102b may stream the received song-1 to the fourth electronic device 308 and the fifth electronic device 312 from a playback time at which the first electronic device 102a got disconnected.

In the meanwhile, the first electronic device 102a may still be connected to the third electronic device 102c and may detect that the streaming of song-1 may either be completed or interrupted due to disconnection. Further, the first electronic device 102a may detect caching for the receipt of the content stream of song-6 from the third electronic device 102c to the secondary buffer 110b of the first electronic device 102a, may be in-progress. In such a scenario, the first electronic device 102a may be configured to dynamically switch the caching of the content stream of song-6 from the secondary buffer 110b to the primary buffer 110a. The dynamic switching makes possible to free-up the secondary buffer 110b for further receipt (or communication) of another multimedia content item from (or to) another electronic device.

In another scenario, the first electronic device 102a may communicate a current streaming status, for example of song-1 as currently communicated to the second electronic device 102b, to other electronic devices, the fourth electronic device 308, and the fifth electronic device 312. The first electronic device 102a may end continuous synching of the communicated playback controls with the second electronic device 102b. In such a case, streaming of the song-1 may still resume to the other electronic devices, such as the fourth electronic device 308, and the fifth electronic device 312. The remaining content of the song-1 that is yet to be streamed may be retrieved from the secondary memory 206 of the first electronic device 102a to the primary buffer 110a of the first electronic device 102a, until the entire content of the song-1 is streamed at least to the second electronic device 102b. The second electronic device 102b may then further stream to other electronic devices based on ownership right. In the meantime, the first electronic device 102a may playback the content stream of song-6 received from the third electronic device 102c.

Figure 4A:
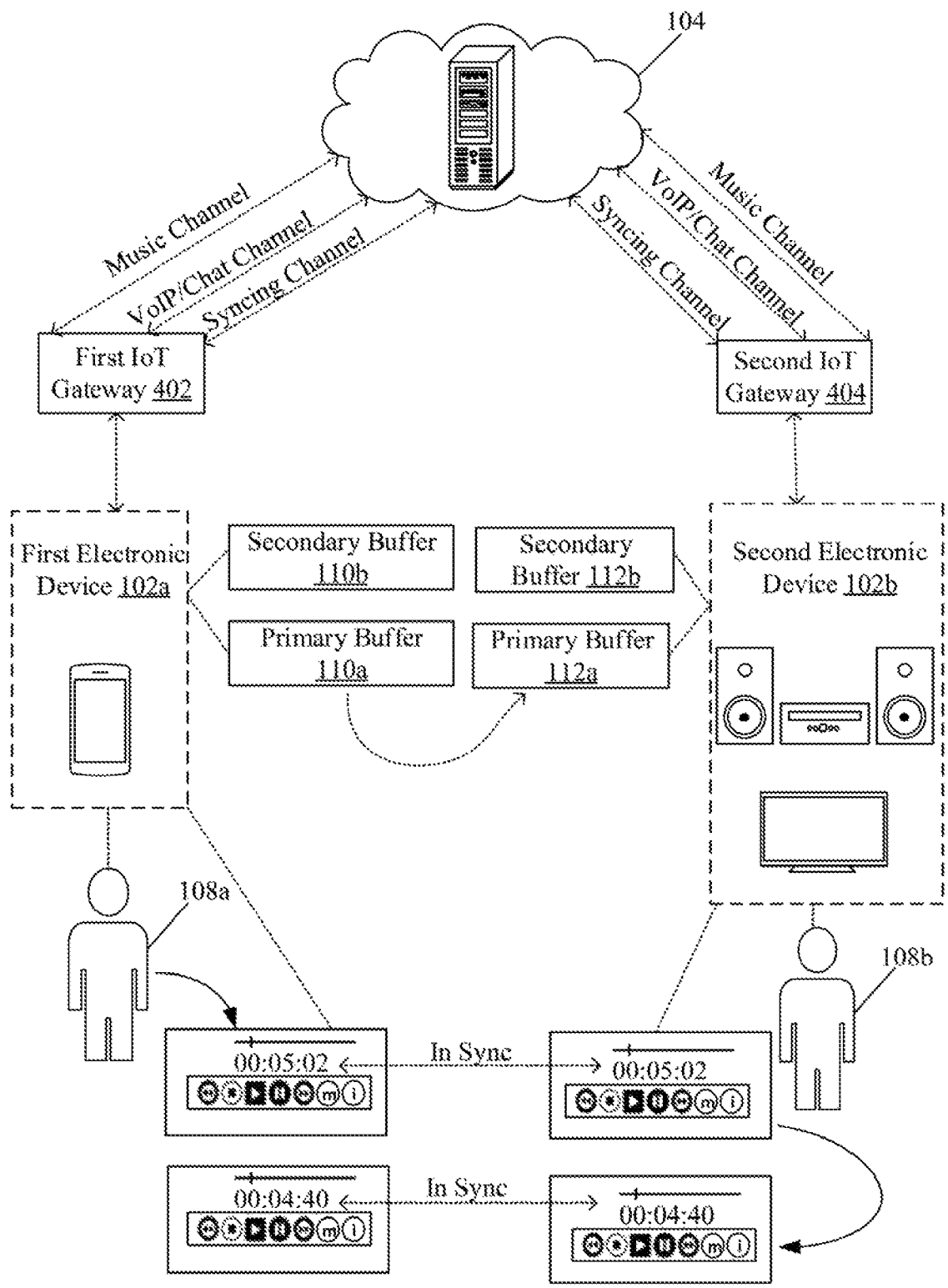
FIG. 4A illustrates a second exemplary scenario for implementation of the disclosed system and method for sharing multimedia content with synched playback controls, in accordance with an embodiment of the disclosure.

FIG. 4A illustrates a second exemplary scenario to share multimedia content with synched playback controls, in accordance with an embodiment of the disclosure. FIG. 4A is described in conjunction with elements from FIGS. 1, 2, and 3A to 3C. With reference to FIG. 4A, there is shown the first electronic device 102a, the second electronic device 102b, the multimedia streaming server 104, a first IoT gateway 402, and a second IoT gateway 404.

In accordance with the second exemplary scenario, the first electronic device 102a may be a smartphone. The second electronic device 102b may be an IoT-enabled music system or an IoT-enabled smart TV. The first electronic device 102a may be associated with the first IOT gateway 402. The second IOT gateway 404 may be associated with the second electronic device 102b.

The first IOT gateway 402 may act as a bridge between an IoT device, such as the first electronic device 102a, and the multimedia streaming server 104. The first IOT gateway 402 may receive data from the first electronic device 102a via one or more communication protocols, such as Wi-Fi, and then transmit the received content as per preset configurations, to the multimedia streaming server 104, via one or more communication channels via the Internet. Similarly, the second IOT gateway 404 may act as a bridge between the second electronic device 102b (such as the IoT-enabled music system) and the multimedia streaming server 104. The second IOT gateway 404 may receive data from the second electronic device 102b via one or more communication channels and protocols, such as Wi-Fi, and then transmit the received content as per preset configurations, to the multimedia streaming server 104, via one or more communication channels via the Internet.

In accordance with an embodiment, the first electronic device 102a may receive an input to select an audio or a video file along with the associated playback controls. The first electronic device 102a may communicate the audio or the video file along with the associated playback controls to the second electronic device 102b. The first electronic device 102a may control the playback of the audio or the video file such that a current playback time of the selected audio or the video file may be in sync at the first electronic device 102a and second electronic device 102b, during the playback. Further, the playback controls associated with the shared audio or video file, may be operable at both sides, such as the first electronic device 102a and the second electronic device 102b.

For example, the first user 108a may slide a playback control associated with the shared music on the first electronic device 102a, via the UI 214, to a playback time of 5 minutes 2 seconds "00:05:02", as shown. Accordingly, the playback control at the second electronic device 102b may be automatically synchronized to 5 minutes 2 seconds "00:05:02", as shown. Thus, the devices to which the music is shared may listen to the music simultaneously, providing an enhanced user experience of sitting together and listening to both the first user 108a and the second user 108b based on the communicated playback controls. After a certain time, the second user 108b may then slide back the playback control on the second electronic device 102b to a playback time of 4 minutes 40 seconds "00:04:40", from the same playback controls received from the first electronic device 102a. Accordingly, the playback control at the first electronic device 102a may be automatically synchronized to 4 minutes 40 seconds "00:04:40", as shown. Thus, the playback controls associated with the shared audio or video file, may be operable and functional at both sides, such as the first electronic device 102a and the second electronic device 102b.

In accordance with an embodiment, the audio or the video file communicated to the second electronic device 102b may be sourced from the multimedia streaming server 104. The communicated audio or the video file may be cached at the primary buffer 112a of the second electronic device 102b. The first electronic device 102a may schedule the communication of the audio or the video file along with the playback controls to the second electronic device 102b from the multimedia streaming server 104. The scheduled communication of the audio or the video file together with the playback controls may be based on a time of day or a pre-scheduled date. For example, the first electronic device 102a may schedule the communication of a pre-selected audio on a pre-scheduled date, such as a next birthday, of the second user 108b associated with the second electronic device 102b. The multimedia streaming server 104 may then communicate the pre-selected audio on the scheduled date to the second electronic device 102b to be played mandatorily at the second electronic device 102b.

In accordance with an embodiment, the communication of the selected audio or video file and the synching of the communicated playback controls may be performed, via a same communication channel or different communication channels. In a first example, the first electronic device 102a may be configured to communicate the selected audio or video item via a first communication channel, referred to as a music channel. The playback controls associated with the selected audio or video item may be communicated to an IoT gateway, such as first IoT gateway 402. The first IoT gateway 402 may then check metadata to find out which device the playback controls associated with the selected audio or video item, require to be communicated. Accordingly, the first IoT gateway 402 may then further communicate the playback controls via a second communication channel, referred to as a synching channel. Further, a social interaction between the first electronic device 102a and the second electronic device 102b may occur simultaneously via a third communication channel, such as a VOIP or chat channel.

In a second example, the first electronic device 102a may be configured to communicate all data, such as the selected audio or video item, the associated playback controls, and text chat data of social interaction via the UI 214, to the first IoT gateway 402, as shown in FIG. 4. The first IoT gateway 402 may then check metadata and preset configurations, and further communicate the received data via different communication channels, such as the first communication channel (the music channel), the second communication channel (the synching channel), and the third communication channel (such as the VOIP or chat channel). The received data communicated via the different communication channels, may be received via a cloud service provider, such as the multimedia streaming server 104. The multimedia streaming server 104 may then further communicate the data received from various IoT devices (such as the first electronic device 102*a*) to other IoT gateways, such as the second IoT gateway 404, via the different communication channels. The second IoT gateway 404 based on pre-configured settings may then consolidate the received multimedia content and associated playback controls, and then communicate locally to the second electronic device 102*b*, as shown.

In a third example, an alarm mechanism may be set to trigger playback of the scheduled and pre-selected audio or video file at the second electronic device 102*b*. Such communication of the set alarm mechanism may occur via a fourth communication channel, which may be referred to as "an alarm payload channel". The alarm mechanism may be set via the UI 214. The usage of different communication channels may make possible continuous and accurate synching of the communicated playback controls during the playback and avoid network slowness or congestion.

Figure 4B:
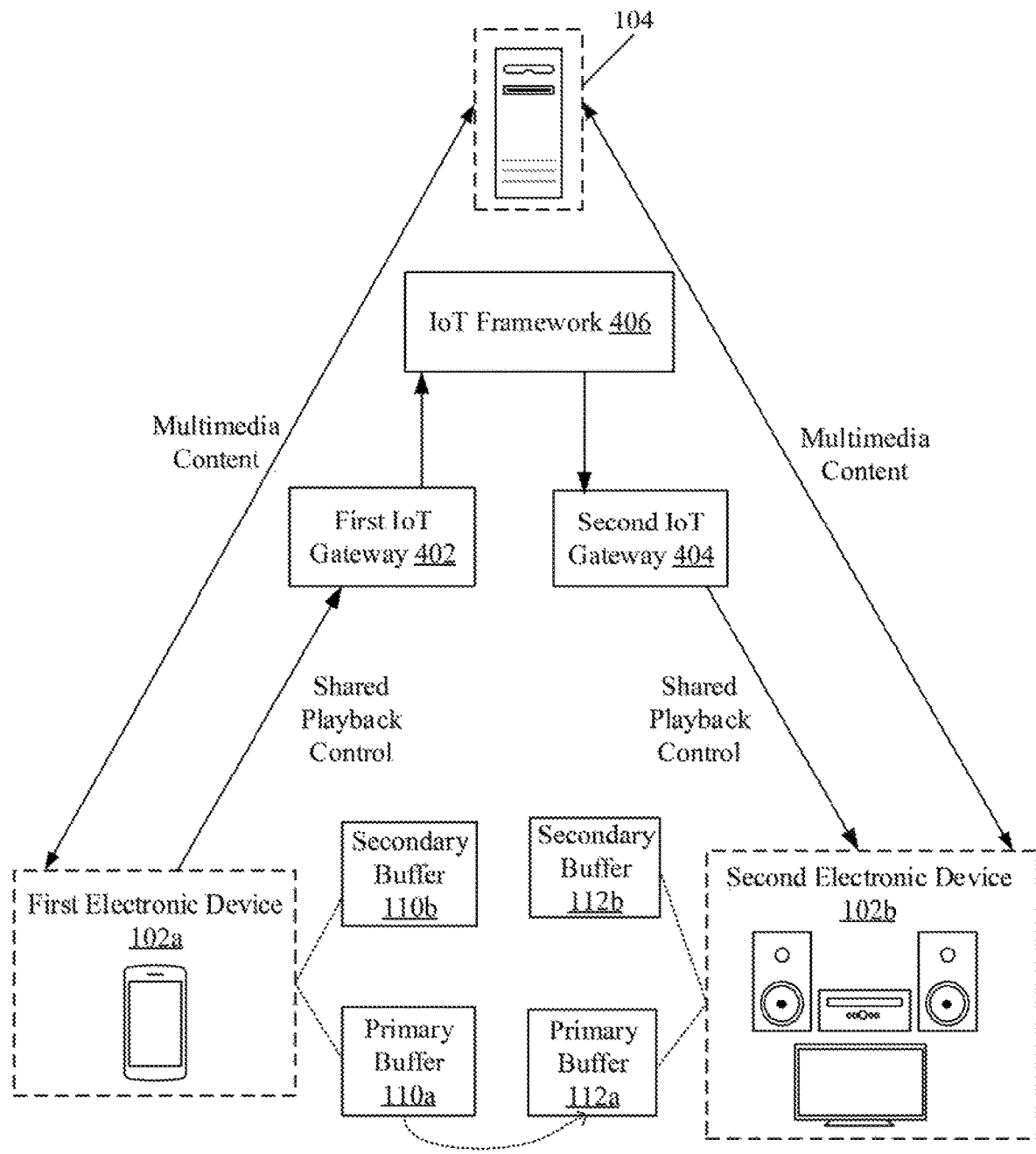
FIG. 4B illustrates a third exemplary scenario for implementation of the disclosed system and method for sharing multimedia content with synched playback controls, in accordance with an embodiment of the disclosure.

FIG. 4B illustrates a third exemplary scenario to share multimedia content with synched playback controls, in accordance with an embodiment of the disclosure. FIG. 4B is described in conjunction with elements from FIGS. 1, 2, 3A to 3D, and 4A. With reference to FIG. 4B, there is shown the first electronic device 102*a*, the second electronic device 102*b*, the multimedia streaming server 104, the first IoT gateway 402, the second IoT gateway 404, and an IoT framework 406.

In accordance with the third exemplary scenario, the first IoT gateway 402 and the second IoT gateway 404 may be communicatively coupled with each other, via the IoT framework 406. The first IoT gateway 402 may act as a bridge between an IoT device, such as the first electronic device 102*a*, and the IoT framework 406. The first IoT gateway 402 may receive data from the first electronic device 102*a* via one or more communication protocols, such as Wi-Fi, and then transmit the received content as per preset configurations, to the IoT framework 406, via one or more communication channels via the Internet. Similarly, the second IOT gateway 404 may act as a bridge between the second electronic device 102*b* (such as the IoT-enabled music system) and the IoT framework 406. The multimedia streaming server 104 in this case may be a third party server, such as a service provider different from the IoT framework 406. The second IOT gateway 404 may receive data from the second electronic device 102*b* via one or more communication channels and protocols, such as Wi-Fi, and then transmit the received content as per preset configurations, to the IoT framework 406, via one or more communication channels, such as the Internet.

In accordance with an embodiment, the first electronic device 102*a* may receive an audio or a video file from the second electronic device 102*b* via a cloud service provider, such as the multimedia streaming server 104. The multimedia streaming server 104 may correspond to a third party server. The first electronic device 102*a* may receive the audio or video item via the first communication channel (the music channel) from the multimedia streaming server 104. The first electronic device 102*a* may be configured to communicate the playback controls associated with the received audio or video item to an IoT gateway, such as first IoT gateway 402. The first IoT gateway 402 may then check metadata to find out which device the playback controls associated with the received audio or video item, required to be communicated. Accordingly, the first IoT gateway 402 may then further communicate the playback controls to the second electronic device 102*b*, via the IoT framework 406. The first IoT gateway 402 may use the second communication channel (the synching channel) for the communication of the playback controls to the second electronic device 102*b*. The second electronic device 102*b* may receive the playback controls via the second IoT gateway 404. Further, the social interaction between the first electronic device 102*a* and the second electronic device 102*b* may occur simultaneously by use of the third communication channel (such as the VOIP or the chat channel), via the IoT framework 406.

Figure 4C:
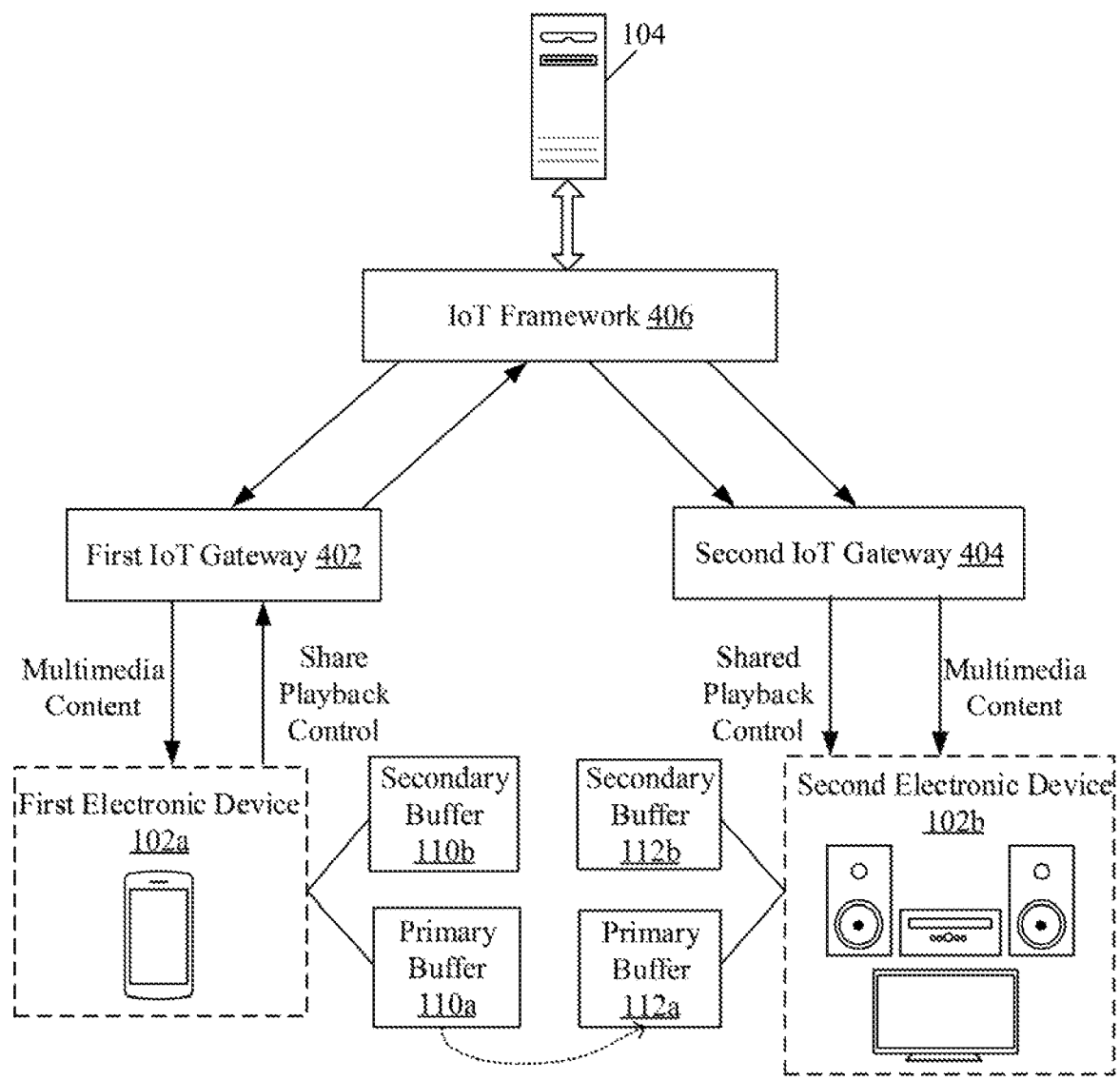
FIG. 4C illustrates a fourth exemplary scenario for implementation of the disclosed system and method for sharing multimedia content with synched playback controls, in accordance with an embodiment of the disclosure.

FIG. 4C illustrates a fourth exemplary scenario to share multimedia content with synched playback controls, in accordance with an embodiment of the disclosure. FIG. 4C is described in conjunction with elements from FIGS. 1, 2, 3A to 3C, 4A, and 4B. With reference to FIG. 4C, there is shown the first electronic device 102*a*, the second electronic device 102*b*, the multimedia streaming server 104, the first IoT gateway 402, the second IoT gateway 404, and the IoT framework 406.

In accordance with the fourth exemplary scenario, the IoT framework 406 may be communicatively coupled to a cloud service provider, such as the multimedia streaming server 104. The multimedia streaming server 104 may correspond to a third party server. In accordance with an embodiment, the IoT framework 406 may be configured to receive an audio or a video file from the multimedia streaming server 104. The IoT framework 406 may further transmit the received audio or a video file to the first electronic device 102*a* and the second electronic device 102*b*, via the first IoT gateway 402 and the second IoT gateway 404, respectively. The received audio or a video file may be transmitted to the first electronic device 102*a* and the second electronic device 102*b* by use of the first communication channel (the music channel).

The first electronic device 102*a* may be configured to communicate the playback controls associated with the received audio or video item to the first IoT gateway 402. The first IoT gateway 402 may then check metadata to find out which device the playback controls associated with the received audio or video item, required to be communicated. Accordingly, the first IoT gateway 402 may then further communicate the playback controls to the second electronic device 102*b*, via the IoT framework 406. The first IoT gateway 402 may use the second communication channel (the synching channel) for the communication of the playback controls to the second electronic device 102*b*. The second electronic device 102*b* may receive the playback controls via the second IoT gateway 404. Further, a social interaction between the first electronic device 102*a* and the second electronic device 102*b* may occur simultaneously by use of the third communication channel (such as the VOIP or the chat channel), via the IoT framework 406.

Figure 4D:
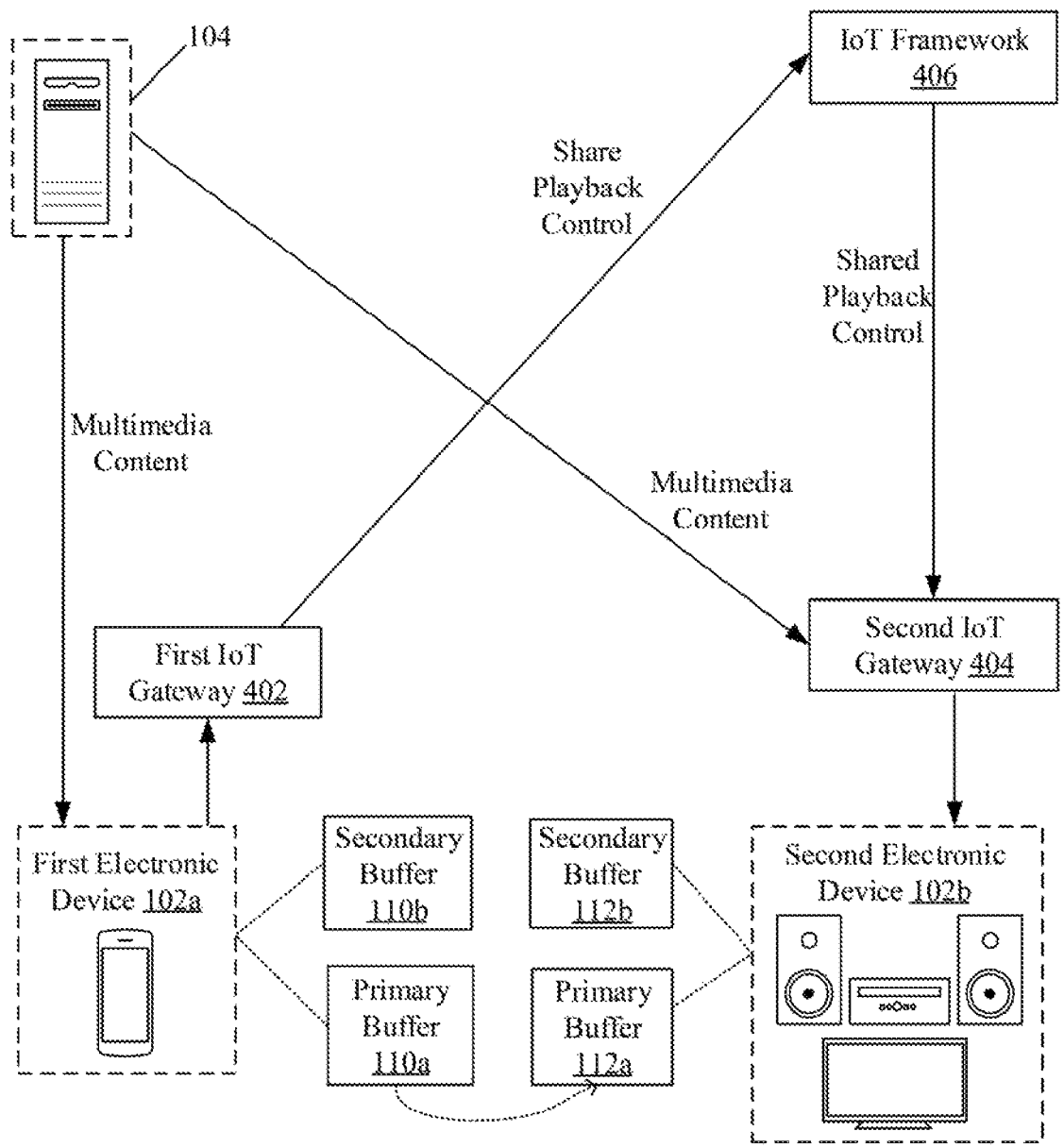
FIG. 4D illustrates a fifth exemplary scenario for implementation of the disclosed system and method for sharing multimedia content with synched playback controls, in accordance with an embodiment of the disclosure.

FIG. 4D illustrates a fifth exemplary scenario to share multimedia content with synched playback controls, in accordance with an embodiment of the disclosure. FIG. 4D is described in conjunction with elements from FIGS. 1, 2, 3A to 3C, and 4A to 4C. With reference to FIG. 4D, there is shown the first electronic device 102*a*, the second electronic device 102*b*, the multimedia streaming server 104, the first IoT gateway 402, the second IoT gateway 404, and the IoT framework 406.

In accordance with the fifth exemplary scenario, the first electronic device 102A and the second electronic device 1026 may receive an audio or a video file from a cloud service provider, such as the multimedia streaming server 104. The multimedia streaming server 104 may correspond to a third party server. The first electronic device 102a may be configured to communicate the playback controls associated with the received audio or video item to the first IoT gateway 402. The first IoT gateway 402 may then check metadata to find out which device the playback controls associated with the received audio or video item, required to be communicated. Accordingly, the first IoT gateway 402 may then further communicate the playback controls to the second electronic device 102b, via the IoT framework 406. The first IoT gateway 402 may use the second communication channel (the synching channel) for the communication of the playback controls to the second electronic device 102b. The second electronic device 102b may receive the playback controls via the second IoT gateway 404. Further, the social interaction between the first electronic device 102a and the second electronic device 102b may occur simultaneously by use of the third communication channel (such as the VOIP or the chat channel), via the IoT framework 406.

Figure 5A:
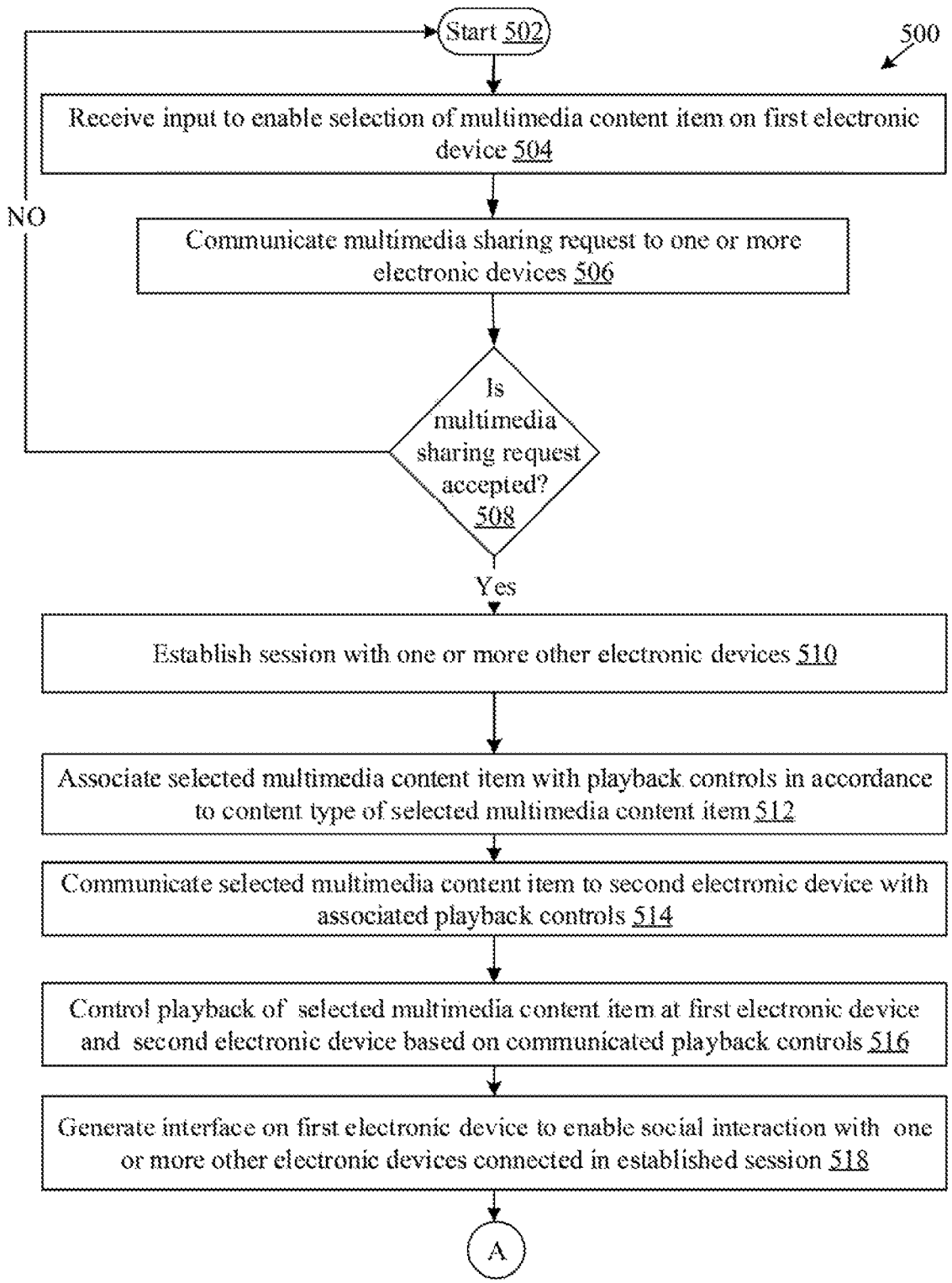
FIGS. 5A and 5B, collectively, depict a flow chart that illustrates an exemplary method for sharing multimedia content with synched playback controls, in accordance with an embodiment of the disclosure.
Figure 5B:
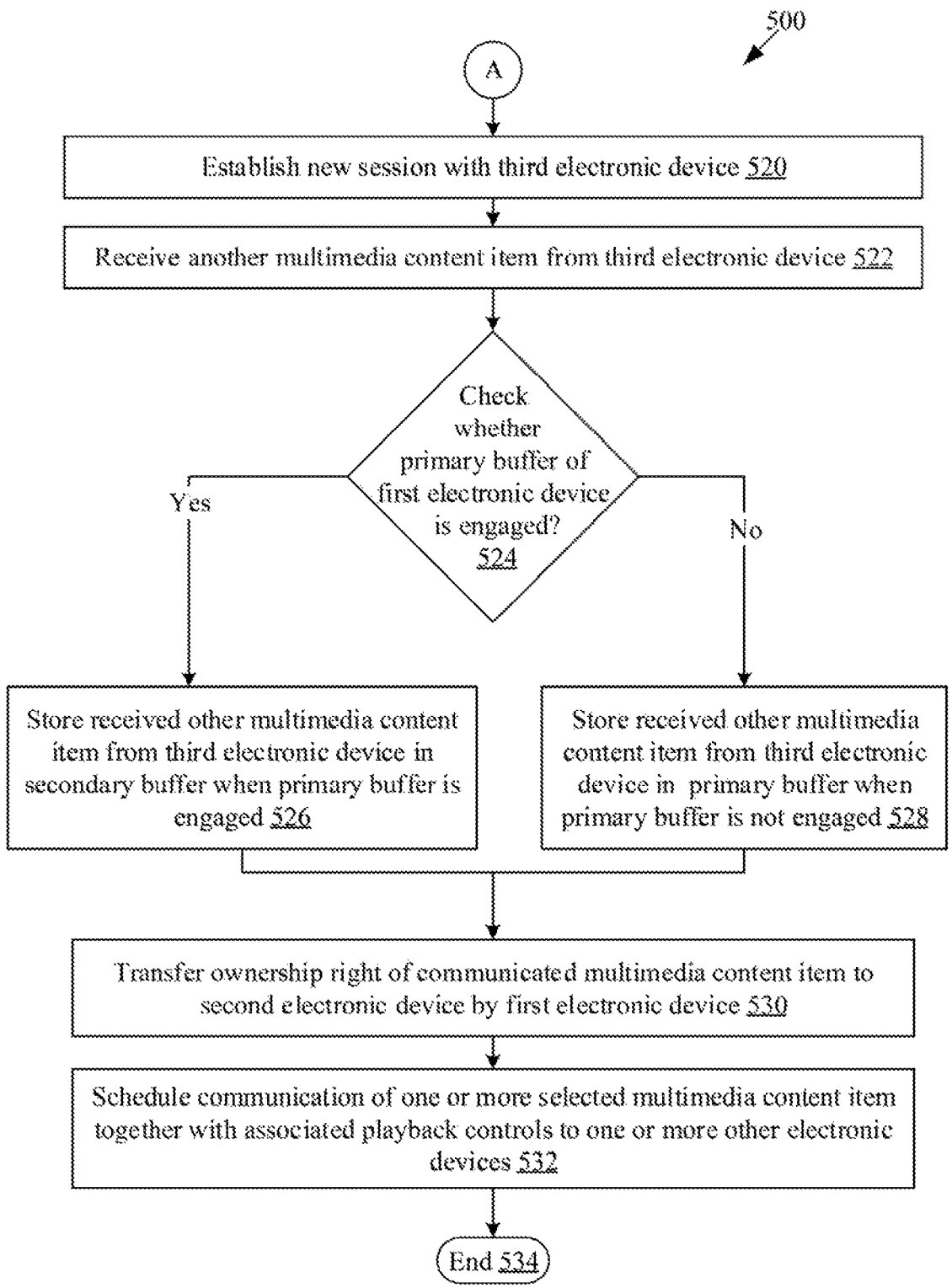

FIGS. 5A and 5B, collectively, is a flow chart that illustrates an exemplary method to share multimedia content with synched playback control, in accordance with an embodiment of the disclosure. With reference to FIGS. 5A and 5B, there is shown a flow chart 500. The flow chart 500 is described in conjunction with elements from FIGS. 1, 2, 3A to 3C, and 4. The method starts at step 502 and proceeds to step 504.

At step 504, an input may be received at the first electronic device 102a to enable selection of a multimedia content item, such as Song-1, on the first electronic device 102a. The multimedia content item may be an audio or a video. The multimedia content item may be sourced from a multimedia streaming server 104. Alternatively, the multimedia content item may be pre-stored at a local storage device, such as the secondary memory 206, of the first electronic device 102a.

At step 506, a multimedia sharing request may be communicated to one or more electronic devices, such as the second electronic device 102b. At step 508, it may be checked whether the multimedia sharing request is accepted or rejected by the one or more electronic devices, such as the second electronic device 102b. In instances when the multimedia sharing request is accepted, the control may pass to step 510, else the control may pass back to the step 502 to request to another electronic device.

At step 510, a session may be established between the first electronic device 102a and one or more other electronic devices, which accepted the multimedia sharing request (such as the second electronic device 102b). At step 512, the selected multimedia content item may be associated with playback controls in accordance to the content type of the selected multimedia content item. At step 514, the selected multimedia content item may be communicated to the second electronic device 102b along with the associated playback controls. The selected multimedia content item may be streamed from the primary buffer 110a of the first electronic device 102a to the second electronic device 102b. The streamed multimedia content item may be cached at a corresponding primary buffer (such as the primary buffer 112a) of the second electronic device 102b.

At step 516, the playback of the selected multimedia content item may be controlled at the first electronic device 102a and the second electronic device 102b based on the communicated playback controls. The control may be performed such that a current playback time of the selected multimedia content item may be in sync at the first electronic device 102a and the second electronic device 102b, during the playback of the selected multimedia content item. The control may be performed based on synching of the communicated playback controls. At step 518, an interface may be generated on the first electronic device 102a to enable a social interaction with the one or more other electronic devices connected in the established session. The social interaction among connected devices and the playback of the selected multimedia content item at the connected devices (such as the second electronic device 102b) may occur simultaneously.

At step 520, a new session may be established with the third electronic device 102c. The new session may be established by the first electronic device 102a in response to an acceptance of a new multimedia sharing request from the third electronic device 102c. At step 522, another multimedia content item may be received from the third electronic device 102c, while simultaneously streaming the multimedia content item from the primary buffer 110a of the first electronic device 102a.

At step 524, it may be continuously checked whether the primary buffer 110a of the first electronic device 102a is engaged. In instances when the primary buffer 110a is engaged, the control may pass to step 526. In instances when the primary buffer 110a is not engaged, the control may pass to step 528.

At step 526, the other multimedia content item received from the third electronic device 102c may be stored in the secondary buffer 110b when the primary buffer 110a is engaged. At step 528, the other multimedia content item received from the third electronic device 102c may be stored in the primary buffer 110a when the primary buffer 110a is not engaged.

At step 530, an ownership right of the communicated multimedia content item may be transferred to the second electronic device 102b, by the first electronic device 102a. The transfer of the ownership right to the second electronic device 102b may enable the second electronic device 102b to control further communication of the multimedia content item to other electronic devices, such as the third electronic device 102c. At step 532, one or more selected multimedia content items together with the associated playback controls may be scheduled to be communicated to one or more other electronic devices, such as the third electronic device 102c, or the second electronic device 102b. The scheduling of the communication of the multimedia content item may be based on a time of day, a date, and/or a user-defined mechanism to initiate communication to the desired or pre-selected one or more other electronic devices. The one or more selected multimedia content items together with the associated playback controls may be sourced from the multimedia streaming server 104 or the secondary memory 206 of the first electronic device 102a to be automatically communicated to the pre-selected one or more other electronic devices based on the scheduled time or date. The control may pass to end step 534.

In accordance with an embodiment of the disclosure, a system for data communication is disclosed. The system may include the first electronic device 102a (FIG. 1) which may comprise one or more circuits (hereinafter referred to as the processor 202 (FIG. 2)). The processor 202 may be configured to receive an input to enable selection of a multimedia content item on the first electronic device 102a. The processor 202 may be further configured to communicate the selected multimedia content item to the second electronic device 102b along with playback controls. The processor 202 may be configured to control playback of the selected multimedia content item at the first electronic device 102a and the second electronic device 102b. The control may be performed such that a current playback time of the selected multimedia content item may be in sync at the first electronic device 102a and the second electronic device 102b, based on the synching of the communicated playback controls.

Various embodiments of the disclosure may provide another non-transitory computer readable medium and/or storage medium, wherein there is stored thereon, a set of instructions executable by a machine and/or a computer to communicate data. The set of instructions may cause the machine and/or computer to perform the steps that comprise a receipt of an input to enable selection of a multimedia content item on the first electronic device 102a. The selected multimedia content item may be communicated to the second electronic device 102b along with the playback controls. The first electronic device 102a control playback of the selected multimedia content item at the first electronic device 102a and the second electronic device 102b. A current playback time of the selected multimedia content item may be synced at the first electronic device 102a and the second electronic device 102b based on synching of the communicated playback controls.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. A system, comprising:
at least one circuit in a first electronic device, wherein said at least one circuit is configured to:
receive an input for selection of a first multimedia content item on said first electronic device;
associate said selected first multimedia content item with playback controls;
communicate said selected first multimedia content item to a second electronic device along with said playback controls associated with said selected first multimedia content item, wherein
said selected first multimedia content item is streamed to said second electronic device as a multimedia stream, from a first primary buffer of said first electronic device, and
said selected first multimedia content item is cached at a second primary buffer of said second electronic device, for a continuous synchronization of said playback controls during playback;
dynamically reconfigure, based on a mismatch between a data size of said second primary buffer and a data size of said multimedia stream, said data size of said multimedia stream of said selected first multimedia content item;
pause said playback of said selected first multimedia content item at said first electronic device for a specific time interval, wherein
said playback of said selected first multimedia content item is continued at said second electronic device during said specific time interval, and
said playback of said selected first multimedia content item is paused at a first playback time of said selected first multimedia content item; and
resume said playback of said selected first multimedia content item at said first electronic device after said specific time interval, wherein
said playback is resumed at said first electronic device from a second playback time of said selected first multimedia content item,
said second playback time corresponds to a current playback time of said selected first multimedia content item at said second electronic device, and
said playback is resumed based on synchronization of said playback controls received by said second electronic device with said playback controls associated with said selected first multimedia content item at said first electronic device.

2. The system according to claim 1, wherein said first electronic device and said second electronic device correspond to one of a smartphone, a tablet device, a wearable device, a speaker system, a camera, a smart glass, a television, a computing device, a multimedia output device, a projector, an augmented-reality device, a virtual-reality device, or an Internet-of-Things (IoT) device.

3. The system according to claim 1, wherein said selected first multimedia content item is one of an audio or a video.

4. The system according to claim 1, wherein said second electronic device controls said playback of said selected first multimedia content item at said first electronic device based on said playback controls received by said second electronic device from said first electronic device.

5. The system according to claim 1, wherein said communication of said selected first multimedia content item and said synchronization of said playback controls is executed via different communication channels.

6. The system according to claim 1, wherein said communication of said selected first multimedia content item and said synchronization of said playback controls are executed via a same communication channel.

7. The system according to claim 1, wherein
said selected first multimedia content item communicated to said second electronic device is sourced from one of a multimedia streaming server or a local storage device of said first electronic device, and
said synchronization of said communicated playback controls is executed via an Internet-of-Things (IoT) framework.

8. The system according to claim 1, wherein
said at least one circuit is further configured to establish a session with a third electronic device to receive a second multimedia content item from said third electronic device while said first multimedia content item is concurrently streamed from said first primary buffer of said first electronic device, and
said second multimedia content item is stored in a secondary buffer of said first electronic device based on said first primary buffer of said first electronic device that is engaged to stream said first multimedia content item.

9. The system according to claim 1, wherein said at least one circuit is further configured to schedule said communication of said selected first multimedia content item together with said playback controls to said second electronic device from a content streaming server based on at least one of a time of day, a date, or a user-defined trigger mechanism to initiate said communication to said second electronic device.

10. The system according to claim 1, wherein said at least one circuit is further configured to transfer an ownership right of said selected first multimedia content item to said second electronic device to control communication of said selected first multimedia content item from said second electronic device to a third electronic device.

11. The system according to claim 1, wherein
said at least one circuit is further configured to generate an interface on said first electronic device to enable a social interaction with a plurality of electronic devices connected in a session,
said plurality of electronic devices include said first electronic device and said second electronic device, and
said social interaction among said plurality of electronic devices and said playback of said selected first multimedia content item at said plurality of electronic devices occur concurrently.

12. A method, comprising:
receiving, by at least one circuit in a first electronic device, an input for selection of a first multimedia content item on said first electronic device;
associating, by said at least one circuit, said selected first multimedia content item with playback controls;
communicating, by said at least one circuit, said selected first multimedia content item to a second electronic device along with said playback controls associated with said selected first multimedia content item, wherein
said selected first multimedia content item is streamed to said second electronic device as a multimedia stream, from a first primary buffer of said first electronic device, and
said selected first multimedia content item is cached at a second primary buffer of said second electronic device, for a continuous synchronization of said playback controls during playback;
dynamically reconfiguring by said at least one circuit, based on a mismatch between a data size of said second primary buffer and a data size of said multimedia stream, said data size of said multimedia stream of said selected first multimedia content item;
pausing, by said at least one circuit, said playback of said selected first multimedia content item at said first electronic device for a specific time interval, wherein
said playback of said selected first multimedia content item is continued at said second electronic device during said specific time interval, and
said playback of said selected first multimedia content item is paused at a first playback time of said selected first multimedia content item; and
resuming, by said at least one circuit, said playback of said selected first multimedia content item at said first electronic device after said specific time interval, wherein
said playback is resumed at said first electronic device from a second playback time of said selected first multimedia content item,
said second playback time corresponds to a current playback time of said selected first multimedia content item at said second electronic device, and
said playback is resumed based on synchronization of said playback controls received by said second electronic device with said playback controls associated with said selected first multimedia content item at said first electronic device.

13. The method according to claim 12, wherein said second electronic device controls said playback of said selected first multimedia content item at said first electronic device based on said playback controls received by said second electronic device from said first electronic device.

14. The method according to claim 12, wherein said communication of said selected first multimedia content item and said synchronization of said playback controls is executed via different communication channels.

15. The method according to claim 12, wherein said communication of said selected first multimedia content item and said synchronization of said playback controls are executed via a same communication channel.

16. The method according to claim 12, further comprising establishing, by said at least one circuit, a session with a third electronic device to receive a second multimedia content item from said third electronic device while concurrently streaming said first multimedia content item from said first primary buffer of said first electronic device,
wherein said second multimedia content item is stored in a secondary buffer of said first electronic device based on said first primary buffer of said first electronic device being engaged to stream said first multimedia content item.

17. The method according to claim 12, further comprising scheduling, by said at least one circuit, said communication of said selected first multimedia content item together with said playback controls to said second electronic device from a content streaming server based on at least one of a time of day, a date, or a user-defined trigger mechanism to initiate said communication to said second electronic device.

18. The method according to claim 12, further comprising transferring, by said at least one circuit, an ownership right of said selected first multimedia content item to said second electronic device to control communication of said selected first multimedia content item from said second electronic device to a third electronic device.

19. The method according to claim 12, further comprising generating, by said at least one circuit, an interface on said first electronic device to enable a social interaction with a plurality of electronic devices connected in a session, wherein said plurality of electronic devices include said first electronic device and said second electronic device, and said social interaction among said plurality of electronic devices and said playback of said selected first multimedia content item at said plurality of electronic devices occur concurrently.

* * * * *